(12) United States Patent
Kimura et al.

(10) Patent No.: US 11,474,245 B2
(45) Date of Patent: Oct. 18, 2022

(54) DISTANCE MEASUREMENT USING HIGH DENSITY PROJECTION PATTERNS

(71) Applicant: Magik Eye Inc., New York, NY (US)

(72) Inventors: Akiteru Kimura, Hachioji (JP); Jan Heller, Prague (CZ)

(73) Assignee: Magik Eye Inc., New York, NY (US)

( * ) Notice: Subject to any disclaimer, the term of this patent is extended or adjusted under 35 U.S.C. 154(b) by 759 days.

(21) Appl. No.: 16/431,076

(22) Filed: Jun. 4, 2019

(65) Prior Publication Data
US 2019/0377088 A1    Dec. 12, 2019

Related U.S. Application Data

(60) Provisional application No. 62/681,236, filed on Jun. 6, 2018.

(51) Int. Cl.
*H04B 10/00* (2013.01)
*G01S 17/48* (2006.01)
*G01S 17/32* (2020.01)
*G01S 17/89* (2020.01)

(52) U.S. Cl.
CPC .............. *G01S 17/48* (2013.01); *G01S 17/32* (2013.01); *G01S 17/89* (2013.01)

(58) Field of Classification Search
CPC combination set(s) only.
See application file for complete search history.

(56) References Cited

U.S. PATENT DOCUMENTS

| 4,914,460 A | 4/1990 | Caimi et al. |
| 5,061,062 A | 10/1991 | Schneiter |
| 5,699,444 A | 12/1997 | Palm |
| 5,730,702 A | 3/1998 | Tanaka et al. |

(Continued)

FOREIGN PATENT DOCUMENTS

| CN | 101794065 A | 8/2010 |
| CN | 102193295 A | 9/2011 |

(Continued)

OTHER PUBLICATIONS

EP Search Report mailed in corresponding EP Patent Application No. 19815592 dated Feb. 8, 2022, 12 pages.

(Continued)

*Primary Examiner* — Agustin Bello
(74) *Attorney, Agent, or Firm* — Tong, Rea, Bentley & Kim, LLC (57) ABSTRACT

In one example, a method includes instructing, by a processing system of a distance sensor, a pattern projector of the distance sensor to project a pattern of light onto an object, wherein the pattern comprises a plurality projection artifacts, detecting, by the processing system, a location of a first projection artifact of the plurality of artifacts in an image of the object that includes the pattern of light, wherein the detecting comprises identifying an area of peak light intensity within a window corresponding to a trajectory of the first projection artifact, wherein the trajectory represents a range of potential movement of the first projection artifact on an imaging sensor of the distance sensor, and calculating, by the processing system, a distance from the distance sensor to the object based in part on the location of the first projection artifact.

20 Claims, 8 Drawing Sheets

(56) References Cited

U.S. PATENT DOCUMENTS

| | | |
|---|---|---|
| 5,870,136 A | 2/1999 | Fuchs et al. |
| 5,980,454 A | 11/1999 | Broome |
| 6,038,415 A | 3/2000 | Nishi et al. |
| 6,122,039 A | 9/2000 | Schumacher |
| 6,442,476 B1 | 8/2002 | Poropat |
| 6,668,082 B1 | 12/2003 | Davison et al. |
| 6,937,350 B2 | 8/2005 | Shirley |
| 7,191,056 B2 | 3/2007 | Costello et al. |
| 7,193,645 B1 | 3/2007 | Aagaard et al. |
| 7,375,803 B1 | 5/2008 | Bamji |
| 7,589,825 B2 | 9/2009 | Orchard et al. |
| 9,098,909 B2 | 8/2015 | Nomura |
| 9,488,757 B2 | 11/2016 | Mukawa |
| 9,536,339 B1 | 1/2017 | Worley et al. |
| 9,686,539 B1 | 6/2017 | Zuliani et al. |
| 9,888,225 B2 | 2/2018 | Znamensky et al. |
| 9,986,208 B2 | 5/2018 | Chao et al. |
| 10,223,793 B1 | 3/2019 | Ebrahimi et al. |
| 10,228,243 B2 * | 3/2019 | Kimura ............... H01S 5/423 |
| 11,158,074 B1 * | 10/2021 | Kantor ............... G06T 7/521 |
| 2003/0071891 A1 | 4/2003 | Geng |
| 2004/0041996 A1 * | 3/2004 | Abe ............... G01C 3/08 |
| | | 356/3.01 |
| 2004/0167744 A1 | 8/2004 | Lin et al. |
| 2005/0111009 A1 * | 5/2005 | Keightley ............... G01B 11/25 |
| | | 356/602 |
| 2005/0288956 A1 | 12/2005 | Speicher |
| 2006/0044546 A1 | 3/2006 | Lewin et al. |
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2008/0259354 A1 | 10/2008 | Gharib |
| 2010/0007719 A1 | 1/2010 | Frey et al. |
| 2010/0149315 A1 | 6/2010 | Qu et al. |
| 2010/0209002 A1 | 8/2010 | Thiel et al. |
| 2010/0223706 A1 | 9/2010 | Becker et al. |
| 2010/0238416 A1 | 9/2010 | Kuwata |
| 2010/0303341 A1 | 12/2010 | Hausler |
| 2011/0037849 A1 | 2/2011 | Niclass et al. |
| 2011/0188054 A1 | 8/2011 | Petronius et al. |
| 2012/0050528 A1 * | 3/2012 | Davies ............... G01C 11/02 |
| | | 348/136 |
| 2012/0051588 A1 | 3/2012 | Mceldowney |
| 2012/0056982 A1 | 3/2012 | Katz et al. |
| 2012/0062758 A1 | 3/2012 | Devine et al. |
| 2012/0076375 A1 | 3/2012 | Saijo et al. |
| 2012/0105867 A1 * | 5/2012 | Komatsu ............... G01B 11/25 |
| | | 356/610 |
| 2012/0113252 A1 | 5/2012 | Yang et al. |
| 2012/0219699 A1 | 8/2012 | Pettersson |
| 2012/0225718 A1 | 9/2012 | Zhang |
| 2012/0236288 A1 * | 9/2012 | Stanley ............... G06F 3/017 |
| | | 356/615 |
| 2012/0236317 A1 * | 9/2012 | Nomura ............... G06T 7/521 |
| | | 356/610 |
| 2012/0307260 A1 | 12/2012 | Keshavmurthy |
| 2013/0038882 A1 | 2/2013 | Umeda et al. |
| 2013/0050710 A1 * | 2/2013 | Yamaguchi ............... G06F 3/011 |
| | | 356/610 |
| 2013/0076865 A1 | 3/2013 | Tateno et al. |
| 2013/0088575 A1 | 4/2013 | Park et al. |
| 2013/0155417 A1 | 6/2013 | Ohsawa |
| 2013/0201325 A1 * | 8/2013 | Kessler ............... A61M 13/003 |
| | | 348/135 |
| 2013/0242090 A1 * | 9/2013 | Yoshikawa ......... G01B 11/2513 |
| | | 348/136 |
| 2013/0307933 A1 | 11/2013 | Znamensky et al. |
| 2013/0314688 A1 | 11/2013 | Likholyot |
| 2014/0000020 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hérbert |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0012244 A1 | 1/2015 | Oki |
| 2015/0293210 A1 | 1/2015 | Imamura |
| 2015/0062558 A1 | 3/2015 | Koppal et al. |
| 2015/0077764 A1 | 3/2015 | Braker et al. |
| 2015/0116460 A1 * | 4/2015 | Jouet ............... G06T 15/50 |
| | | 348/46 |
| 2015/0131054 A1 | 5/2015 | Wuellner et al. |
| 2015/0016003 A1 | 6/2015 | Terry et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1 | 11/2015 | Oumi |
| 2015/0336013 A1 | 11/2015 | Stenzier et al. |
| 2015/0347833 A1 | 12/2015 | Robinson |
| 2015/0381907 A1 | 12/2015 | Boetliger et al. |
| 2016/0022374 A1 | 1/2016 | Haider |
| 2016/0033262 A1 * | 2/2016 | Kessler ............... G06T 7/521 |
| | | 348/135 |
| 2016/0041266 A1 | 2/2016 | Smits |
| 2016/0050401 A1 * | 2/2016 | Gordon ............... G02B 27/0037 |
| | | 348/744 |
| 2016/0117561 A1 | 4/2016 | Miyazawa et al. |
| 2016/0128553 A1 | 5/2016 | Geng |
| 2016/0157725 A1 | 6/2016 | Munoz |
| 2016/0178915 A1 | 6/2016 | Mor et al. |
| 2016/0249810 A1 | 9/2016 | Darty et al. |
| 2016/0261854 A1 | 9/2016 | Ryu et al. |
| 2016/0267682 A1 | 9/2016 | Yamashita |
| 2016/0288330 A1 | 10/2016 | Konolige |
| 2016/0327385 A1 * | 11/2016 | Kimura ............... G01B 11/026 |
| 2016/0328854 A1 * | 11/2016 | Kimura ............... G01B 11/026 |
| 2016/0334939 A1 | 11/2016 | Dawson et al. |
| 2016/0350594 A1 | 12/2016 | McDonald |
| 2016/0377414 A1 * | 12/2016 | Thuries ............... G02B 27/106 |
| | | 359/558 |
| 2016/0379368 A1 | 12/2016 | Sakas et al. |
| 2017/0067734 A1 | 3/2017 | Heidemann |
| 2017/0098305 A1 | 4/2017 | Gossow |
| 2017/0102461 A1 | 4/2017 | Tezuka et al. |
| 2017/0135617 A1 | 5/2017 | Alasirniöet al. |
| 2017/0221226 A1 | 8/2017 | Shen et al. |
| 2017/0270689 A1 | 9/2017 | Messely et al. |
| 2017/0284799 A1 | 10/2017 | Wexler et al. |
| 2017/0307544 A1 | 10/2017 | Nagata |
| 2017/0347086 A1 | 11/2017 | Watanabe |
| 2018/0010903 A1 | 1/2018 | Takao et al. |
| 2018/0011194 A1 * | 1/2018 | Masuda ............... G01S 17/10 |
| 2018/0012372 A1 * | 1/2018 | Takao ............... G01S 7/4815 |
| 2018/0073863 A1 | 3/2018 | Watanabe |
| 2018/0080761 A1 | 3/2018 | Takao et al. |
| 2018/0106606 A1 * | 4/2018 | Fujita ............... G01C 3/06 |
| 2018/0143018 A1 * | 5/2018 | Kimura ............... G01C 3/08 |
| 2018/0156609 A1 | 6/2018 | Kimura |
| 2018/0227566 A1 | 8/2018 | Price et al. |
| 2018/0247424 A1 | 8/2018 | Bleyer |
| 2018/0249142 A1 | 8/2018 | Hicks et al. |
| 2018/0324405 A1 | 11/2018 | Thirion |
| 2018/0329038 A1 | 11/2018 | Lin et al. |
| 2018/0357871 A1 | 12/2018 | Siminoff |
| 2019/0064359 A1 | 2/2019 | Yang |
| 2019/0086198 A1 * | 3/2019 | Chen ............... G01B 11/026 |
| 2019/0107387 A1 * | 4/2019 | Kimura ............... G01B 11/026 |
| 2019/0108743 A1 * | 4/2019 | Kimura ............... G08B 21/0476 |
| 2019/0122057 A1 * | 4/2019 | Kimura ............... H04N 9/3161 |
| 2019/0295270 A1 * | 9/2019 | Kimura ............... G01C 3/08 |
| 2019/0297241 A1 | 9/2019 | Kimura |
| 2019/0297278 A1 | 9/2019 | Sumi et al. |
| 2019/0377088 A1 * | 12/2019 | Kimura ............... G01S 17/32 |
| 2020/0003556 A1 | 1/2020 | Kimura |
| 2020/0051268 A1 | 2/2020 | Kimura |

(56) References Cited

U.S. PATENT DOCUMENTS

| | | | |
|---|---|---|---|
| 2020/0077010 A1 | 3/2020 | Noguchi | |
| 2020/0090355 A1 | 3/2020 | Hall | |
| 2020/0092524 A1 | 3/2020 | Morris | |
| 2020/0182974 A1* | 6/2020 | Kimura | G01S 17/08 |
| 2020/0236315 A1 | 7/2020 | Kimura | |
| 2020/0278197 A1 | 9/2020 | Tokimitsu | |
| 2020/0309916 A1* | 10/2020 | Kimura | G01S 17/08 |
| 2020/0319309 A1* | 10/2020 | Van Nieuwenhove | G01S 7/4814 |
| 2020/0358961 A1* | 11/2020 | Kimura | G01B 21/042 |

FOREIGN PATENT DOCUMENTS

| | | | |
|---|---|---|---|
| CN | 103428026 A | 4/2013 | |
| CN | 103196385 A | 7/2013 | |
| CN | 103559735 A | 2/2014 | |
| CN | 104160243 A | 11/2014 | |
| CN | 104515514 A | 4/2015 | |
| CN | 104685868 A | 6/2015 | |
| CN | 106067968 A | 11/2016 | |
| CN | 106338244 A | 1/2017 | |
| CN | 106796179 A | 5/2017 | |
| DE | 102016118562 A1 | 3/2017 | |
| EP | 0358628 A2 | 3/1990 | |
| EP | 1 739 391 A2 | 1/2007 | |
| EP | 3 171 129 A1 | 5/2017 | |
| JP | H045112 A | 2/1992 | |
| JP | H0961126 A | 3/1997 | |
| JP | 2002-056348 A | 2/2002 | |
| JP | 2006-313116 A | 11/2006 | |
| JP | 2007-10346 A | 1/2007 | |
| JP | 2007-187581 A | 7/2007 | |
| JP | 2007-315864 A | 12/2007 | |
| JP | 2010-091855 A | 4/2010 | |
| JP | 2010-101683 A | 5/2010 | |
| JP | 4485365 B2 | 6/2010 | |
| JP | 2010-256182 A | 11/2010 | |
| JP | 2011-515703 A | 5/2011 | |
| JP | 2012-047500 A | 3/2012 | |
| JP | 2013-8513179 | 4/2013 | |
| JP | 2014-020978 A | 2/2014 | |
| JP | 2014-044113 A | 3/2014 | |
| JP | 2014-511590 A | 5/2014 | |
| JP | 2014-122789 A | 7/2014 | |
| JP | 2014-238259 A | 12/2014 | |
| JP | 2016-6166747 A | 9/2016 | |
| JP | 6038415 B1 | 12/2016 | |
| JP | 6241793 B2 | 12/2017 | |
| JP | 2018514783 A | 6/2018 | |
| JP | 2019-203822 A | 11/2019 | |
| KR | 10-2013-0000356 A | 1/2013 | |
| KR | 10-2013-0037152 A | 4/2013 | |
| KR | 10-2015-0101749 A | 9/2015 | |
| KR | 10-2016-0020323 | 2/2016 | |
| KR | 10-2017-0005649 A | 1/2017 | |
| KR | 10-2017-0054221 A | 5/2017 | |
| KR | 10-2017-0094968 | 8/2017 | |
| TW | I320480 B | 2/2010 | |
| TW | I451129 B | 4/2012 | |
| WO | WO 2012/081506 A1 | 6/2012 | |
| WO | WO2013/046927 A1 | 4/2013 | |
| WO | WO/2013/145164 | 10/2013 | |
| WO | WO 2014/106843 A2 | 7/2014 | |
| WO | WO 2014/131064 | 8/2014 | |
| WO | WO 2015/166915 A1 | 11/2015 | |
| WO | WO 2016/154218 | 9/2016 | |
| WO | WO 2017/053368 A1 | 3/2017 | |

OTHER PUBLICATIONS

Chinese Office Action mailed in corresponding CN Application No. 201980052241.1 dated Feb. 28, 2022, 22 pages.
International Search Report and Written Opinion mailed in corresponding PCT/US2019/035368 dated Sep. 20, 2019, 12 pages.

* cited by examiner

DISTANCE MEASUREMENT USING HIGH DENSITY PROJECTION PATTERNS

CROSS REFERENCE TO RELATED APPLICATIONS

This application claims the priority of U.S. Provisional Patent Application Ser. No. 62/681,236, filed Jun. 6, 2018, which is herein incorporated by reference in its entirety.

BACKGROUND

U.S. patent application Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include projection systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

In one example, a method includes instructing, by a processing system of a distance sensor, a pattern projector of the distance sensor to project a pattern of light onto an object, wherein the pattern comprises a plurality projection artifacts, wherein each projection artifact of the plurality of projection artifacts is associated with a trajectory representing a range of potential movement of the each projection artifact on an imaging sensor of the distance sensor, where at least a first threshold distance exists between two trajectories that are adjacent in a direction parallel to a direction of movement of the trajectories, and wherein at least a second threshold distance exists between two trajectories that are adjacent in a direction perpendicular to the direction of movement of the trajectories, detecting, by the processing system, a location of a first projection artifact of the plurality of artifacts in an image of the object that includes the pattern of light, wherein the detecting comprises identifying an area of peak light intensity within a first window corresponding to a first trajectory associated with the first projection artifact, and calculating, by the processing system, a distance from the distance sensor to the object based in part on the location of the first projection artifact.

In another example, a non-transitory machine-readable storage medium is encoded with instructions executable by a processor. When executed, the instructions cause the processor to perform operations including In one example, a method includes instructing a pattern projector of the distance sensor to project a pattern of light onto an object, wherein the pattern comprises a plurality projection artifacts, wherein each projection artifact of the plurality of projection artifacts is associated with a trajectory representing a range of potential movement of the each projection artifact on an imaging sensor of the distance sensor, where at least a first threshold distance exists between two trajectories that are adjacent in a direction parallel to a direction of movement of the trajectories, and wherein at least a second threshold distance exists between two trajectories that are adjacent in a direction perpendicular to the direction of movement of the trajectories, detecting a location of a first projection artifact of the plurality of artifacts in an image of the object that includes the pattern of light, wherein the detecting comprises identifying an area of peak light intensity within a first window corresponding to a first trajectory associated with the first projection artifact, and calculating a distance from the distance sensor to the object based in part on the location of the first projection artifact.

In another example, a method includes instructing, by a processing system of a distance sensor, a pattern projector of the distance sensor to project a pattern of light onto an object, wherein the pattern comprises a plurality projection artifacts, detecting, by the processing system, a location of a first projection artifact of the plurality of artifacts in an image of the object that includes the pattern of light, wherein the detecting comprises identifying an area of peak light intensity within a window corresponding to a trajectory of the first projection artifact, wherein the trajectory represents a range of potential movement of the first projection artifact on an imaging sensor of the distance sensor, and calculating, by the processing system, a distance from the distance sensor to the object based in part on the location of the first projection artifact.

DETAILED DESCRIPTION

The present disclosure broadly describes an apparatus, method, and non-transitory computer-readable medium for distance measurement using high density projection patterns. As discussed above, distance sensors such as those described in U.S. patent application Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector, using triangulation techniques.

High-density patterns (i.e., patterns in which the distance between projection artifacts is small) are often desirable as they allow for higher resolution distance measurements to be made. However, the high density of such patterns can also make the distance calculation more complicated. For one, the closer the projection artifacts are to each other, the more likely it is that the movement of the trajectories (moving areas, or ranges of potential movement) of the individual projection artifacts will overlap. This overlap makes it more difficult for the sensor to distinguish the individual projection artifacts and their movements. Since the movement of a projection artifact affects the projection artifact's appearance, and since the distance is calculated based on the appearances of the projection artifacts, this complicates the distance measurement and leads to longer calculation times.

In addition, even a lower density pattern may appear to be denser when the object is closer to the sensor. Specifically, the size, intensity, and spacing of the projection artifacts change with the distance to the object. When the sensor is further away from the object, the projection pattern will appear less dense; the projection artifacts will appear smaller and less bright, with greater spacing between them. When the sensor is closer to the object, the projection pattern will appear denser; the projection artifacts will appear larger and brighter, with less spacing between them. The sizes, intensities, and shapes of the projection artifacts may also change based on the shape, reflectance, and reflectance distribution of the object.

Further complicating matters, an image captured by the detector may include visual noise in addition to the projection pattern. This visual noise may occur as a result of the object's characteristics (e.g., reflectance) and/or the ambient lighting conditions. The visual noise can make it more difficult to accurately recognize projection artifacts in an efficient manner, especially when the projection pattern is very dense.

Examples of the present disclosure provide a way to reliably identify individual projection artifacts in an image of a high density projection pattern, where the image may include visual noise in addition to the projection pattern. In particular, examples of the present disclosure reduce the problem of detecting projection artifact location, which is conventionally a two-dimensional problem, to a one-dimensional problem. In one example, the trajectory of each projection artifact is assigned a window, e.g., a fixed, physical range of locations within which the projection artifact is expected to appear in the projection pattern (according to the principle of triangulation). Examples of the present disclosure assume that the distance sensor has been calibrated to determine these windows. Then, within a given projection artifact's corresponding trajectory window, an area of peak light intensity is identified; this area of peak light intensity is assumed to correspond to the location of the projection artifact. The locations of the projection artifacts can be identified quickly in this manner, allowing for rapid triangulation and calculation of object distance. In further examples, thresholds may be applied to the far ends of the window, such that when the peak light intensity is located beyond these thresholds (e.g., is too close to one of the window edges), the projection artifact is eliminated from the distance calculation. This compensates for visual noise and objects that are too close to the sensor to allow for accurate distance calculation.

Figure 1:
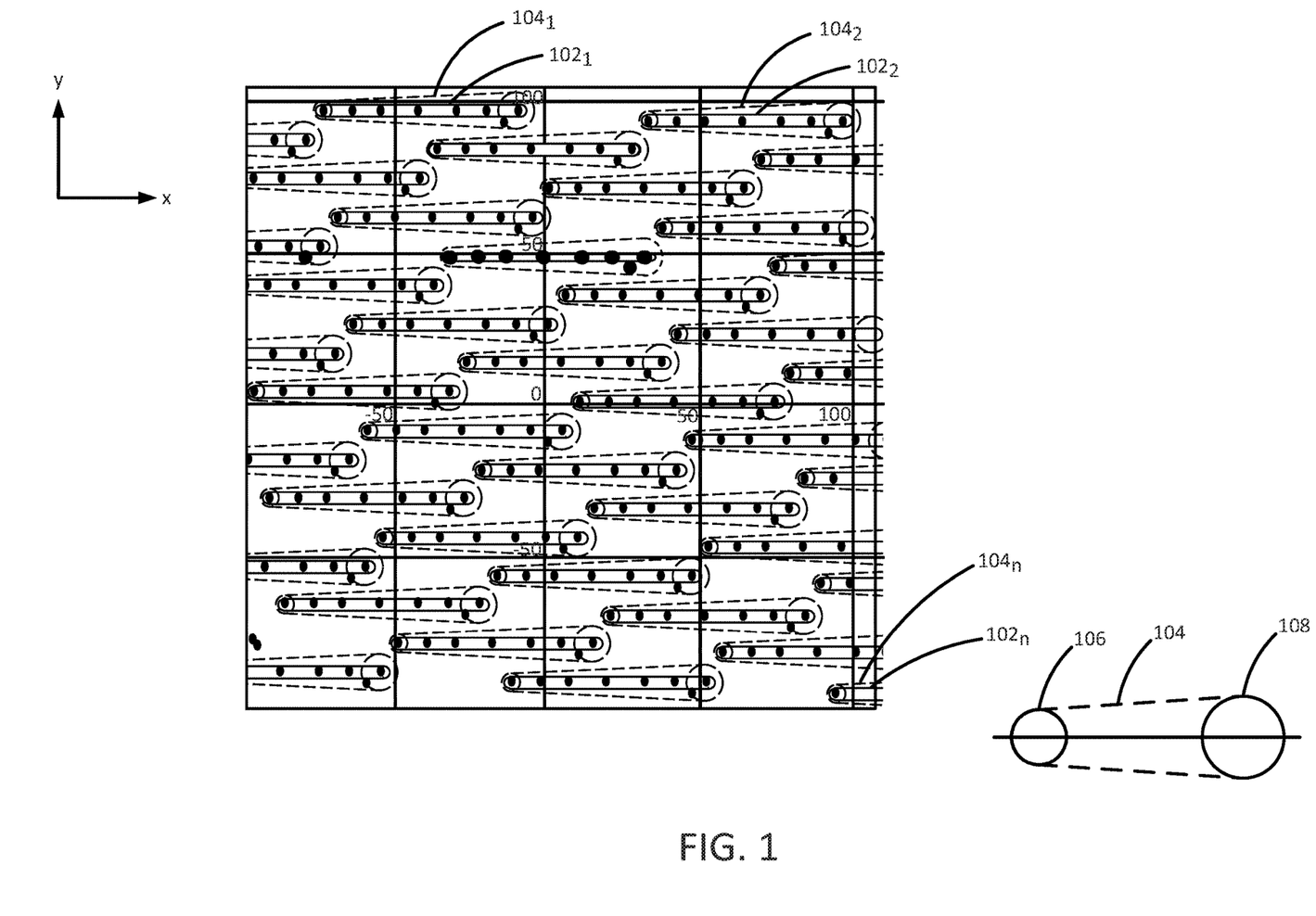
FIG. 1 conceptually illustrates the use of windows to detect the positions of projection artifacts in a projection pattern generated by the projection system of a distance sensor, according to examples of the present disclosure.

FIG. 1 conceptually illustrates the use of windows to detect the positions of projection artifacts in a projection pattern generated by the projection system of a distance sensor, according to examples of the present disclosure. In the example of FIG. 1, the projection artifacts are illustrated as dots; however, the projection artifacts may take other forms such as dashes, x's, or the like. Thus, FIG. 1 employs dots for the sake of example. The projection artifacts may be arranged along the x and y axes of a grid, so that a plurality of rows and a plurality of columns are formed. This arrangement may be symmetrical about a center line (not shown) that is parallel to the y axis (e.g., orthogonal to the rows). The trajectories $102_1$-$102_n$ (hereinafter individually referred to as a "trajectory 102" or collectively referred to as "trajectories 102") of the projection artifacts are parallel to (e.g., move along) the x axis.

In one example, each trajectory 102 is associated with a corresponding window $104_1$-$104_n$ (hereinafter individually referred to as a "window 104" or collectively referred to as "windows 104"). As discussed above, the window 104 for a trajectory 102 represents a fixed, physical range of locations within which the corresponding projection artifact is expected to appear in the projection pattern, when the projection pattern is projected upon an object whose distance is to be calculated. In one example, each window 104 may have a substantially conical or tapered shape. For instance, in FIG. 1, the left side of each window 104 is illustrated as being narrower than the right side of each window. This shape accounts for changes in projection artifact size due to object distance. Specifically, the further away the distance sensor is from the object, the smaller the projection artifact will appear on the object. Conversely, the closer the distance sensor is to the object, the larger the projection artifact will appear on the object. Thus, the narrower end 106 of each window 104 represents a far limit distance for detecting the corresponding projection artifact, while the wider end 108 of the window represents a near limit distance for detecting the corresponding projection artifact.

Figure 2:
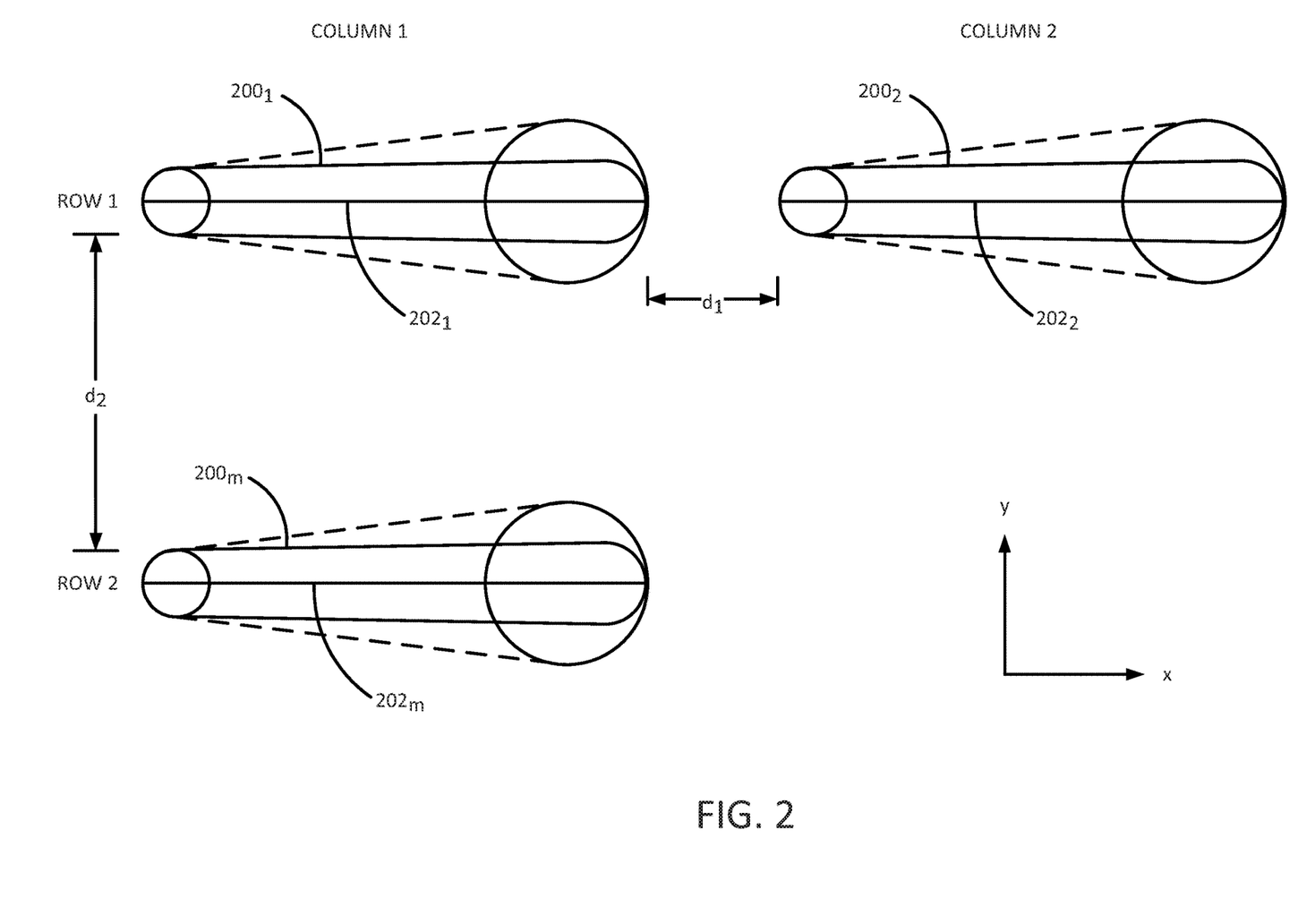
FIG. 2 illustrates a close up view of the trajectories of a plurality of projection artifacts, according to examples of the present disclosure.

It should be noted that in the illustrated example, there is no overlap between collinear, adjacent trajectories 102. That is, the trajectories 102 of two adjacent projection artifacts that appear in the same row of the projection pattern (such as the trajectories $102_1$ and $102_2$) do not overlap. This is conceptually illustrated in FIG. 2, which illustrates a close up view of the trajectories $200_1$-$200_m$ (hereinafter individually referred to as a "trajectory 200" or collectively referred to as "trajectories 200") of a plurality of projection artifacts, according to examples of the present disclosure. As illustrated, there is at least a threshold distance $d_1$ ($d_1 > 0$) between the near limit distance of a given trajectory (e.g., the wide end of the corresponding window) and the far limit distance of an adjacent trajectory (e.g., the narrow end of the window) in the same row. Furthermore, there is at least a threshold distance $d_2$ ($d_2>0$) between the trajectory center (e.g., an imaginary line $202_1$-$202_m$ running through the trajectory 200 that is parallel to the x axis) of a given trajectory 200 and the trajectory center of an adjacent trajectory 200 moving along the y axis. Thus, no two projection artifacts can share the same trajectory center 202. Furthermore, no two windows overlap. It should be noted that the pattern of FIG. 2 has been simplified. For instance, there may be an offset between adjacent rows (e.g., along the x axis) or between adjacent columns (e.g., along the y axis).

Figure 3:
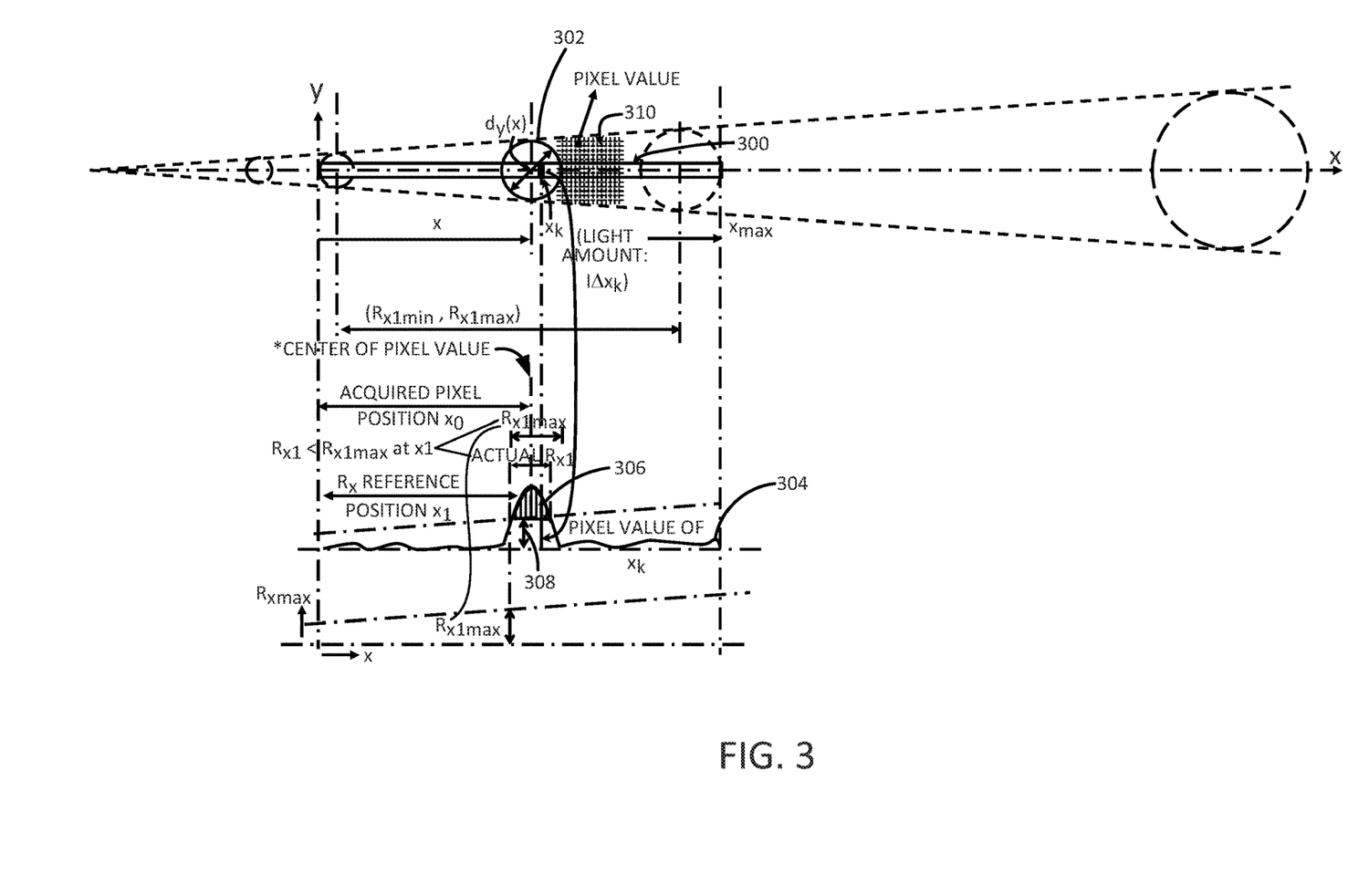
FIG. 3 illustrates the window and associated geometry for a single projection artifact, according to the present disclosure.

FIG. 3 illustrates the window 300 and associated geometry for a single projection artifact 302, according to the present disclosure. FIG. 3 also shows a plot 304 of the distribution of the light intensity (or "pixel value") across the window 300. Here, "pixel value" refers to a value that indicates the intensity of light in the image, as measured at a specific pixel of the distance sensor's imaging sensor 310. As illustrated, the peak light intensity (denoted by peak 306 of the plot 304) coincides with the position of the projection artifact 302 in the window 300.

In one example, in order to reduce the influence of the non-uniformity of the light intensity in the window 300, the average of the light intensity ($l\Delta x_k$) in the y direction may be calculated for a sub-window (e.g., a minute area) $x_k$ of the window 300. This sub-window may stretch across the whole of the y direction in the window 300, but across a minute or limited portion (e.g., five percent or less) of the x direction (e.g., the direction of movement of the projection artifact) in the window 300.

Additionally, the distribution of the light intensity $l\Delta x_k$ in the x direction may be determined, as well as the distribution in the x direction of the light intensity that exceeds a threshold range or value s (denoted in FIG. 3 by line 308). In one example, the limits of the light intensity distribution threshold range, $R_x$min and $R_x$max, have constant or different values with respect to the position x1 of the projection artifact in the x direction (i.e., $R_{x1}$min, $R_{x1}$max). In a further example, the threshold value s may have a constant value or a different value with respect to the position $x_k$ in the x direction.

Thus, in order to determine whether an image acquired by the distance sensor's image sensor corresponds to the projection artifact 302, the following steps may be performed. First, the light intensity distribution range at pixel x1($R_{x1}$) in the x direction of the light intensity $l\Delta x_k$ is compared with a light intensity distribution threshold range ($R_{x1}$min, $R_{x1}$max). The light intensity distribution threshold range ($R_{x1}$min, $R_{x1}$max) may shorten the window 300 by eliminating the far limit distance and the near limit distance of the window 300 from consideration.

Figure 4:
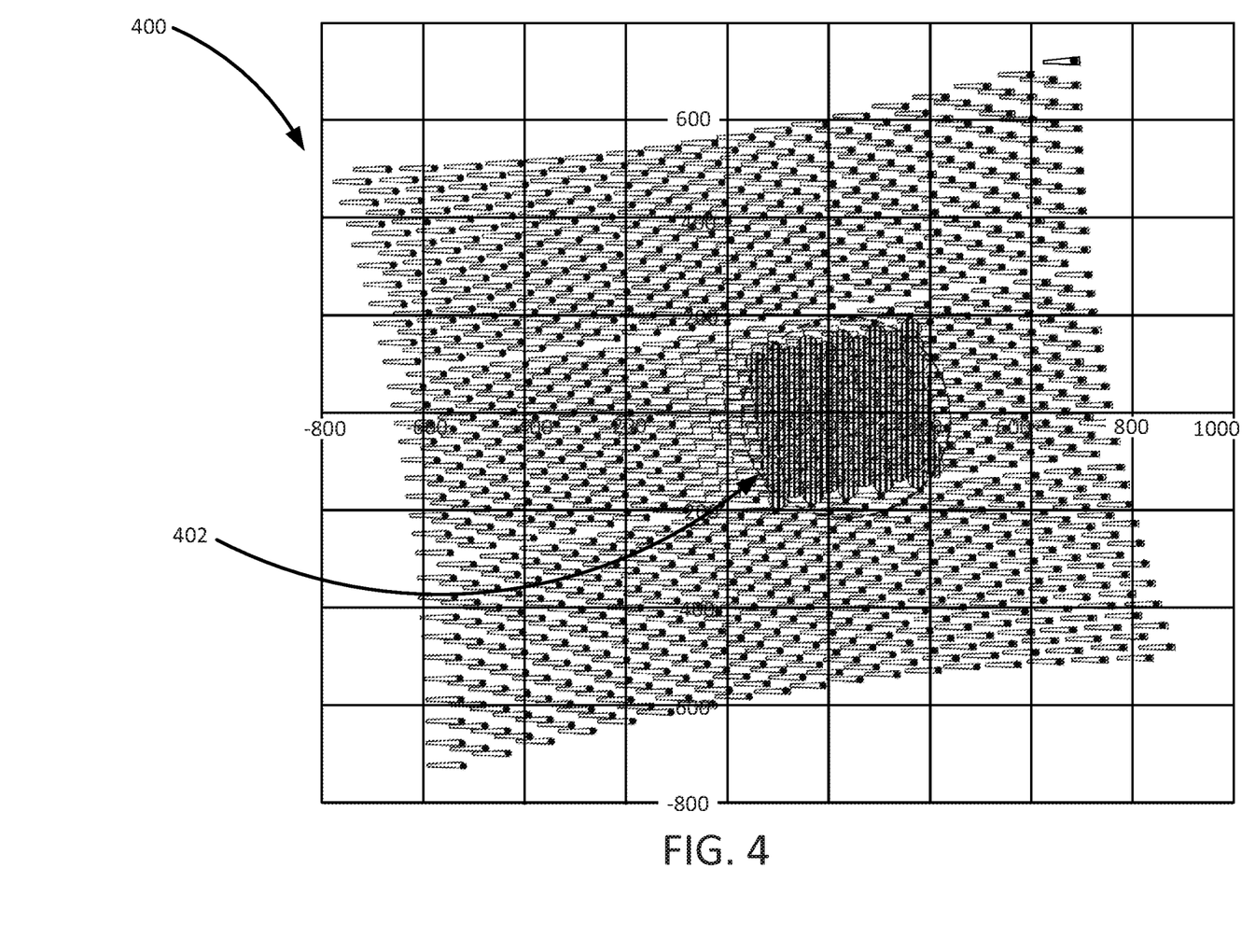
FIG. 4 illustrates an example projection pattern in which the object is so close to the distance sensor that the projection artifacts in an area of the pattern are so large/bright that the projection artifacts overlap each other, making it difficult to differentiate between individual projection artifacts.

When the light intensity distribution range at x1($R_{x1}$) in the x direction of the light intensity $l\Delta x_k$ falls outside of the light intensity distribution threshold range ($R_{x1}$min, $R_{x1}$max), the projection artifact 302 may be ignored (e.g., excluded from a distance measurement calculation). For instance, when $R_{x1}$ is larger than $R_{x1}$max, this may indicate that the object is too close to the distance sensor for the distance sensor to reliably observe the projection artifact 302. An example of this situation is shown in FIG. 4, which illustrates an example projection pattern 400 in which the object is so close to the distance sensor that the projection artifacts in an area 402 of the pattern 400 are so large/bright that the projection artifacts overlap each other, making it difficult to differentiate between individual projection artifacts.

Figure 5:
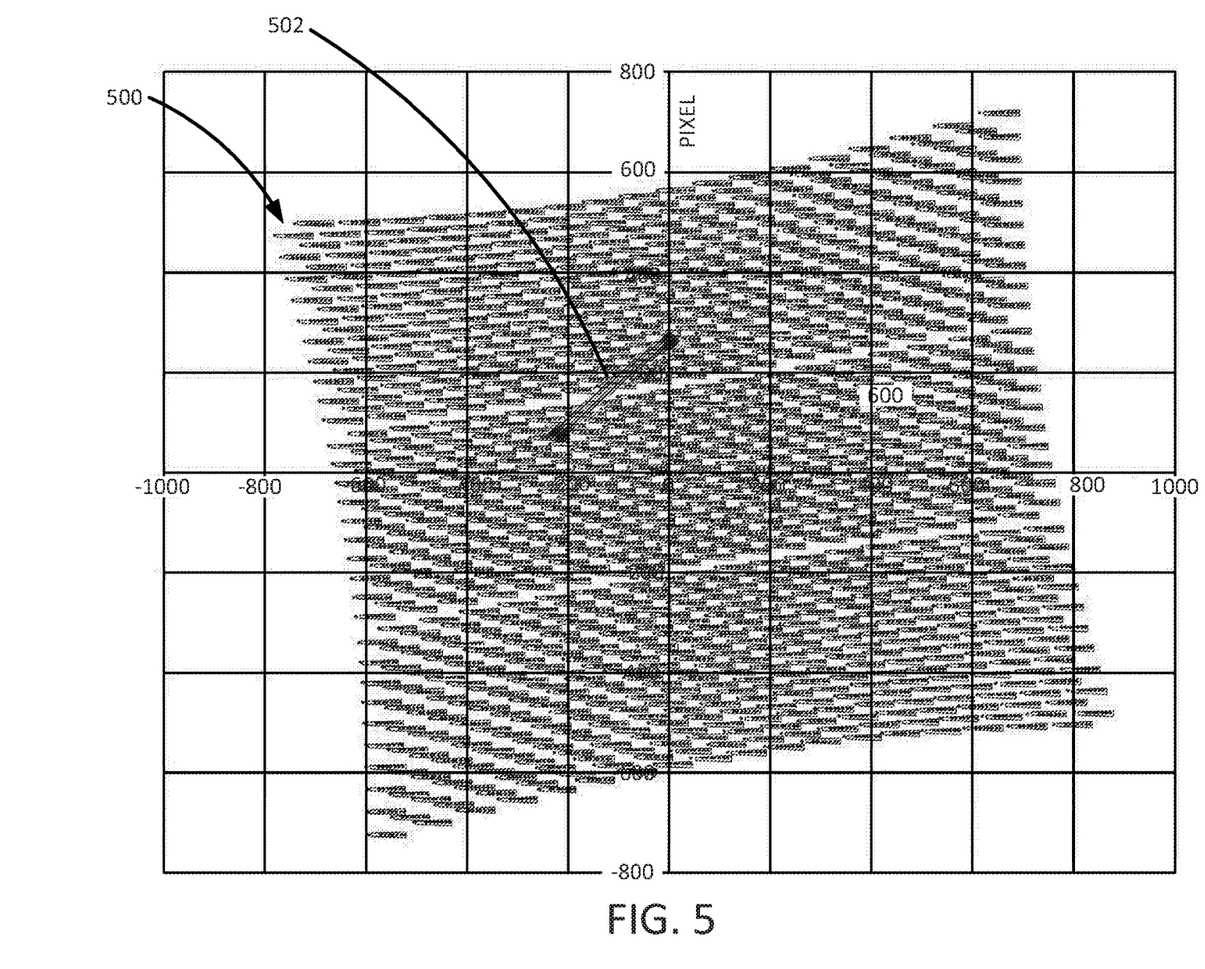
FIG. 5 illustrates an example projection pattern in which optical noise makes it difficult to differentiate between individual projection artifacts in an area of the projection pattern.
Figure 6:
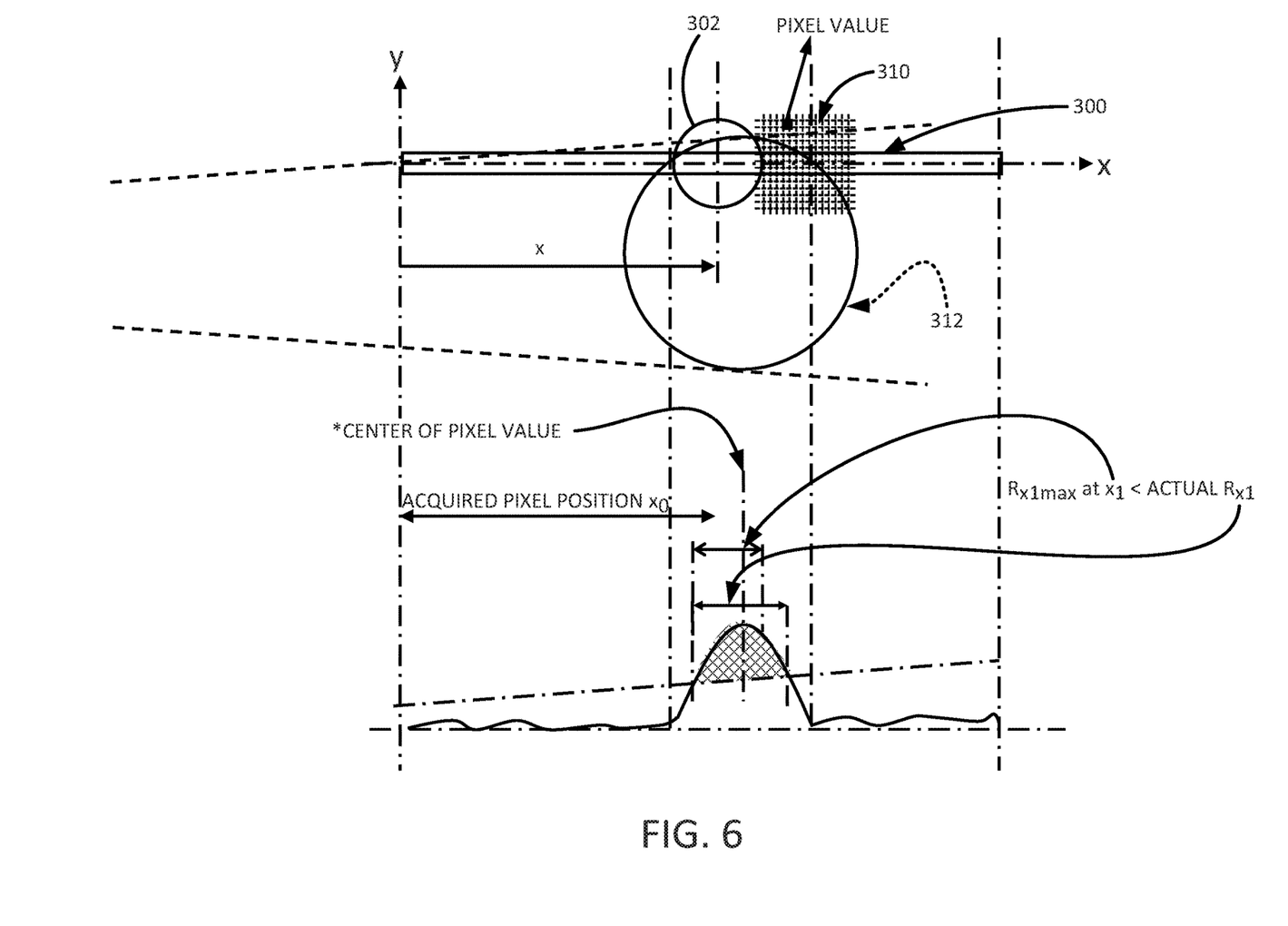
FIG. 6 illustrates the case when there is optical noise present in the window of FIG. 3.

Similarly, when $R_{x1}$ is smaller than $R_{x1}$min, the detected light is likely to be a result of noise rather than the projection artifact 302. An example of this situation is shown in FIG. 5, which illustrates an example projection pattern 500 in which optical noise 502 makes it difficult to differentiate between individual projection artifacts in an area of the projection pattern 500. FIG. 6 also illustrates the case when there is optical noise present in the window 300 of FIG. 3. As shown in FIG. 6, the presence of the optical noise causes $R_{x1}$ to fall outside the light intensity distribution threshold range ($R_{x1}$min, $R_{x1}$max).

However, if the light intensity distribution range at x1($R_{x1}$) in the x direction of the light intensity $l\Delta x_k$ falls within the light intensity distribution threshold range ($R_{x1}$min, $R_{x1}$max), then the location of the projection artifact 302 may be detected with further operations. In one example, for each pixel value that falls within the light intensity distribution threshold range ($R_{x1}$min, $R_{x1}$ max), a value of X0 (the projection artifact) is calculated according to a predetermined algorithm (e.g., taking a central value, a median value, or the like). However, it should be noted that the relationship between light intensity distribution and projection artifact location may vary due to lens characteristics, beam projection characteristics, and other factors.

Figure 7:
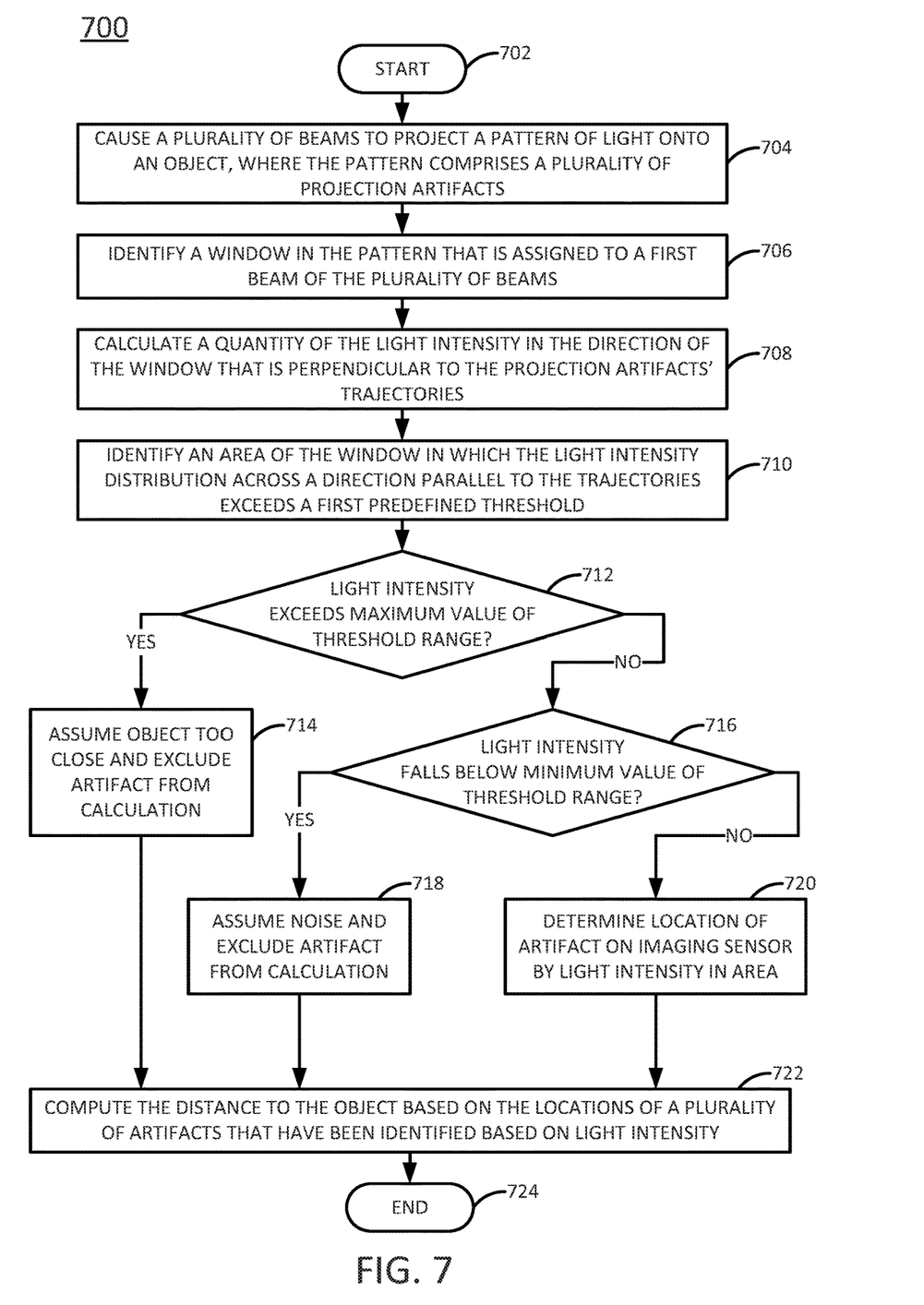
FIG. 7 is a flow diagram illustrating one example of a method for distance measurement using high density projection patterns, according to the present disclosure.

FIG. 7 is a flow diagram illustrating one example of a method 700 for distance measurement using high density projection patterns, according to the present disclosure. The method 700 may be performed, for example, by a processor, such as the processor of a distance sensor or the processor 802 illustrated in FIG. 8. For the sake of example, the method 700 is described as being performed by a processing system.

The method 700 may begin in step 702. In step 704, the processing system may cause a pattern of light to be projected onto an object. The pattern of light may be created by a plurality of beams of a distance sensor's projection system. The plurality of beams may project a plurality of projection artifacts onto an object, where the projection artifacts collectively form the pattern of light, or a "projection pattern." The geometric constraints of the projection pattern may be defined by FIG. 2, above. As discussed above, the light may be of a wavelength that is substantially invisible to the human eye, but that is detectable by an imaging sensor of the distance sensor (e.g., infrared light).

In step 706, the processing system may identify the window assigned to a first beam of the plurality of beams. In one example, it is assumed that at least some beams of the plurality of beams are assigned respective detection areas or "windows" for the respective projection artifacts that the beams create on an object, as discussed above. The lengths of the windows in the x direction may be predetermined and do not overlap. In one example, the window assigned to the first beam has a width in they direction of the projection pattern that is less than or equal to the diameter of the image of first beam's projection artifact on the distance sensor's image sensor.

In step 708, the processing system may calculate a quantity (e.g., a sum or an average) of the light intensity (e.g., the light received by the imaging sensor of the distance sensor) in the y direction of the window (e.g., in a direction perpendicular to the trajectories of the projection artifacts). The quantity of the light intensity in the y direction may be calculated over a sub-window that stretches across the entirety of the window in the y direction, but across a minute portion (e.g., five percent or less) of the window in the x direction.

In step 710, the processing system may identify an area of the window in which the light intensity distribution across the x direction of the window (e.g., in a direction parallel to the trajectories of the projection artifacts) exceeds a first predefined threshold. In one example, the value of the first predefined threshold is set according to a position along the x direction. This area of the window may be denoted as x1.

Next, the processing system may determine whether the light intensity distribution in the area x1 of the window identified in step 708 falls outside of a light intensity distribution threshold range ($R_{x1}$min, $R_{x1}$max). In one example, the minimum and maximum vales of the light intensity distribution threshold range have different values according to a position along the x direction.

In step 712, the processing system may determine whether the light intensity distribution exceeds the maximum value of the light intensity distribution threshold range ($R_{x1}$max). If the processing system determines in step 712 that the light intensity distribution exceeds the maximum value of the light intensity distribution threshold range, then the processing system may proceed to step 714. In step 714, the processing system may exclude the projection artifact associated with the first beam from the distance calculation.

In this case, the processing system may assume that the object whose distance is being detected may be too close to the distance sensor to allow for accurate distance measurement using the projection artifact associated with the first beam. In one example, the processing system may store this assumption in memory. Subsequently, if at least a threshold number of adjacent windows are determined to contain a light intensity distribution that exceeds the maximum value of the light intensity distribution threshold range, the processing system may conclude that the object is too close to the distance sensor. The processing system may generate a signal to alert a user to adjust the distance between the object and the distance sensor. Alternatively, if less than the threshold number of adjacent windows are determined to contain a light intensity distribution that exceeds the maximum value of the light intensity distribution threshold range, the processing system may conclude that optical/light noise is present. In this case, the processing system may adjust the settings (e.g., exposure time) of the distance sensor's image capture means, or may generate a signal to alert a user to make the adjustment.

Referring back to step 712, if the processing system determines in step 712 that the light intensity distribution does not exceed the maximum value of the light intensity distribution threshold range, then the processing system may proceed to step 716. In step 716, the processing system may determine whether the light intensity distribution falls below the minimum value ($R_{x1}$min) of the light intensity distribution threshold range.

If the processing system determines in step 716 that the light intensity distribution falls below the minimum value of the light intensity distribution threshold range, then the processing system may proceed to step 718. In step 718, the processing system may exclude the projection artifact associated with the first beam from the distance calculation. In this case, the processing system may assume that the detected light in the window is optical/light noise rather than a projection artifact.

Alternatively, if the processing system determines in step 716 that the light intensity distribution does not fall below the minimum value of the light intensity distribution threshold range, then the method 700 may proceed to step 720. In step 720, the processing system may determine the location of the projection artifact on the imaging sensor according to a quantity of the light intensity in the area x1 identified in step 708. In one example, the quantity may comprise a center value and/or a median value of the light intensity (which may indicate the center of the projection artifact).

Once the projection artifact is excluded from the distance calculation in accordance with step 714 or step 718 or the location of the projection artifact is determined in step 720, the method 700 proceeds to step 722. In step 722, the processing system may compute the distance from the object to the distance sensor, in accordance with the locations of a plurality of projection artifacts that have been identified based on light intensity (e.g., in accordance with the method 700). Thus, the method 700 may be performed for a plurality of windows associated with the plurality of beams, so that the locations of multiple projection artifacts can be identified.

The method 700 may end in step 724.

The method 700 therefore transforms the conventionally two-dimensional problem of determining projection artifact location into a one-dimensional problem, by seeking out the regions of peak light intensity within fixed windows. These regions of peak intensity, if they satisfy certain threshold criteria, can be assumed to represent the locations of the projection artifacts.

It should be noted that in some cases, multiple areas within a window may meet the threshold criteria (e.g., multiple areas may have a peak light intensity that falls within the light intensity distribution threshold range). In this case, the projection artifacts generated by the beams associated with these windows may be excluded from the distance calculation.

It should be noted that although not explicitly specified, some of the blocks, functions, or operations of the method 700 described above may include storing, displaying and/or outputting for a particular application. In other words, any data, records, fields, and/or intermediate results discussed in the method 700 can be stored, displayed, and/or outputted to another device depending on the particular application. Furthermore, blocks, functions, or operations in FIG. 7 that recite a determining operation, or involve a decision, do not imply that both branches of the determining operation are practiced. In other words, one of the branches of the determining operation may not be performed, depending on the results of the determining operation.

Figure 8:
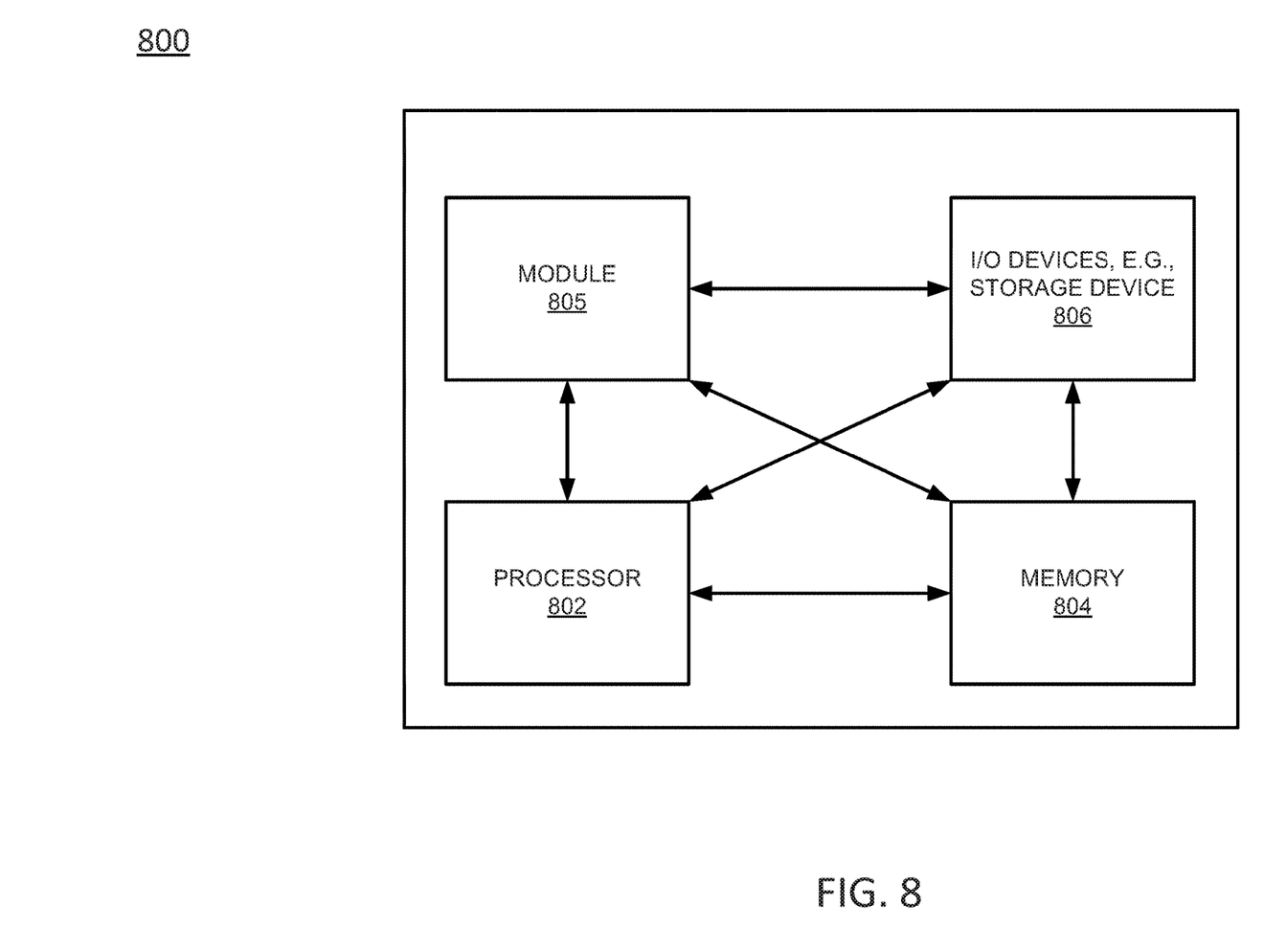
FIG. 8 depicts a high-level block diagram of an example electronic device for calculating the distance from a sensor to an object.

FIG. 8 depicts a high-level block diagram of an example electronic device 800 for calculating the distance from a sensor to an object. As such, the electronic device 800 may be implemented as a processor of an electronic device or system, such as a distance sensor.

As depicted in FIG. 8, the electronic device 800 comprises a hardware processor element 802, e.g., a central processing unit (CPU), a microprocessor, or a multi-core processor, a memory 804, e.g., random access memory (RAM) and/or read only memory (ROM), a module 805 for calculating the distance from a sensor to an object, and various input/output devices 806, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 800 may employ a plurality of processor elements. Furthermore, although one electronic device 800 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 800 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 805 for calculating the distance from a sensor to an object, e.g., machine readable instructions can be loaded into memory 804 and executed by hardware processor element 802 to implement the blocks, functions or operations as discussed above in connection with the method 700. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 805 for calculating the distance from a sensor to an object of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
   instructing, by a processing system of a distance sensor, a pattern projector of the distance sensor to project a pattern of light onto an object, wherein the pattern comprises a plurality projection artifacts, wherein each projection artifact of the plurality of projection artifacts is associated with a trajectory representing a range of potential movement of the each projection artifact on an imaging sensor of the distance sensor, where at least a first threshold distance exists between two trajectories that are adjacent in a direction parallel to a direction of movement of the trajectories, and wherein at least a second threshold distance exists between two trajectories that are adjacent in a direction perpendicular to the direction of movement of the trajectories;
   detecting, by the processing system, a location of a first projection artifact of the plurality of artifacts in an image of the object that includes the pattern of light, wherein the detecting comprises identifying an area of peak light intensity within a first window corresponding to a first trajectory associated with the first projection artifact; and
   calculating, by the processing system, a distance from the distance sensor to the object based in part on the location of the first projection artifact.

2. The method of claim 1, further comprising:
   excluding, by the processing system, a location of a second projection artifact of the plurality of projection artifacts from the calculating, when an area of peak light intensity within a second window corresponding to a second trajectory associated with the second projection artifact falls outside of a predefined threshold range.

3. The method of claim 2, further comprising:
   assuming, by the processing system, that the object is too close to the distance sensor to allow a reliable observation of the second projection artifact, when the area of peak light intensity within the second window is greater than a maximum value of the threshold range, and when at least threshold number of windows adjacent to the second window also exhibit peak light intensities that are greater than the maximum value.

4. The method of claim 3, further comprising:
   generating, by the processing system, a signal to alert a user to adjust a distance between the object and the distance sensor.

5. The method of claim 2, further comprising:
   assuming, by the processing system, that there is too much optical noise to allow a reliable observation of the second projection artifact, when the area of peak light intensity within the second window is greater than a maximum value of the threshold range, and when less than a threshold number of windows adjacent to the second window also exhibit peak light intensities that are greater than the maximum value.

6. The method of claim 5, further comprising:
   generating, by the processing system, a signal to alert a user to adjust a setting of an image capture means of the distance sensor.

7. The method of claim 2, further comprising:
   assuming, by the processing system, that there is too much optical noise to allow a reliable observation of the second projection artifact, when the area of peak light intensity within the second window is less than a minimum value of the threshold range.

8. The method of claim 1, wherein a width of the first window in the direction perpendicular to the direction of movement of the trajectories is no more than a diameter of the first projection artifact.

9. The method of claim 8, further comprising, prior to the detecting:
   calculating, by the processing system, a quantity of light intensity over a sub-window of the first window, wherein the sub-window stretches across an entirety of the first window in the direction perpendicular to the direction of movement of the trajectories, but stretches across less than an entirety of the first window in the direction parallel to the direction of movement of the trajectories.

10. The method of claim 9, wherein the quantity is a sum of the light intensity.

11. The method of claim 9, wherein the quantity is an average of the light intensity.

12. The method of claim 1, wherein the peak light intensity comprises a center value of the light intensity within the first window.

13. The method of claim 1, wherein the peak light intensity comprises a median value of the light intensity within the first window.

14. The method of claim 1, further comprising:
excluding, by the processing system, a location of a second projection artifact of the plurality of projection artifacts from the calculating, when at least two areas of peak light intensity are detected within a second window corresponding to a second trajectory associated with the second projection artifact.

15. A non-transitory machine-readable storage medium encoded with instructions executable by a processor of a distance sensor, wherein, when executed, the instructions cause the processor to perform operations, the operations comprising:
instructing a pattern projector of the distance sensor to project a pattern of light onto an object, wherein the pattern comprises a plurality projection artifacts, wherein each projection artifact of the plurality of projection artifacts is associated with a trajectory representing a range of potential movement of the each projection artifact on an imaging sensor of the distance sensor, where at least a first threshold distance exists between two trajectories that are adjacent in a direction parallel to a direction of movement of the trajectories, and wherein at least a second threshold distance exists between two trajectories that are adjacent in a direction perpendicular to the direction of movement of the trajectories;
detecting a location of a first projection artifact of the plurality of artifacts in an image of the object that includes the pattern of light, wherein the detecting comprises identifying an area of peak light intensity within a window corresponding to a trajectory of the first projection artifact; and
calculating a distance from the distance sensor to the object based in part on the location of the first projection artifact.

16. A method, comprising:
instructing, by a processing system of a distance sensor, a pattern projector of the distance sensor to project a pattern of light onto an object, wherein the pattern comprises a plurality projection artifacts;
detecting, by the processing system, a location of a first projection artifact of the plurality of artifacts in an image of the object that includes the pattern of light, wherein the detecting comprises identifying an area of peak light intensity within a window corresponding to a trajectory of the first projection artifact, wherein the trajectory represents a range of potential movement of the first projection artifact on an imaging sensor of the distance sensor; and
calculating, by the processing system, a distance from the distance sensor to the object based in part on the location of the first projection artifact.

17. The method of claim 16, further comprising:
excluding, by the processing system, a location of a second projection artifact of the plurality of projection artifacts from the calculating, when an area of peak light intensity within a second window corresponding to a second trajectory associated with the second projection artifact falls outside of a predefined threshold range.

18. The method of claim 16, wherein a width of the first window in the direction perpendicular to the direction of movement of the trajectories is no more than a diameter of the first projection artifact.

19. The method of claim 18, further comprising, prior to the detecting:
calculating, by the processing system, a quantity of light intensity over a sub-window of the first window, wherein the sub-window stretches across an entirety of the first window in the direction perpendicular to the direction of movement of the trajectories, but stretches across less than an entirety of the first window in the direction parallel to the direction of movement of the trajectories.

20. The method of claim 16, further comprising:
excluding, by the processing system, a location of a second projection artifact of the plurality of projection artifacts from the calculating, when at least two areas of peak light intensity are detected within a second window corresponding to a second trajectory associated with the second projection artifact.

* * * * *